Aug. 5, 1958   R. N. FALGE   2,846,568
HEADLIGHT LENS
Filed April 9, 1954   2 Sheets-Sheet 1
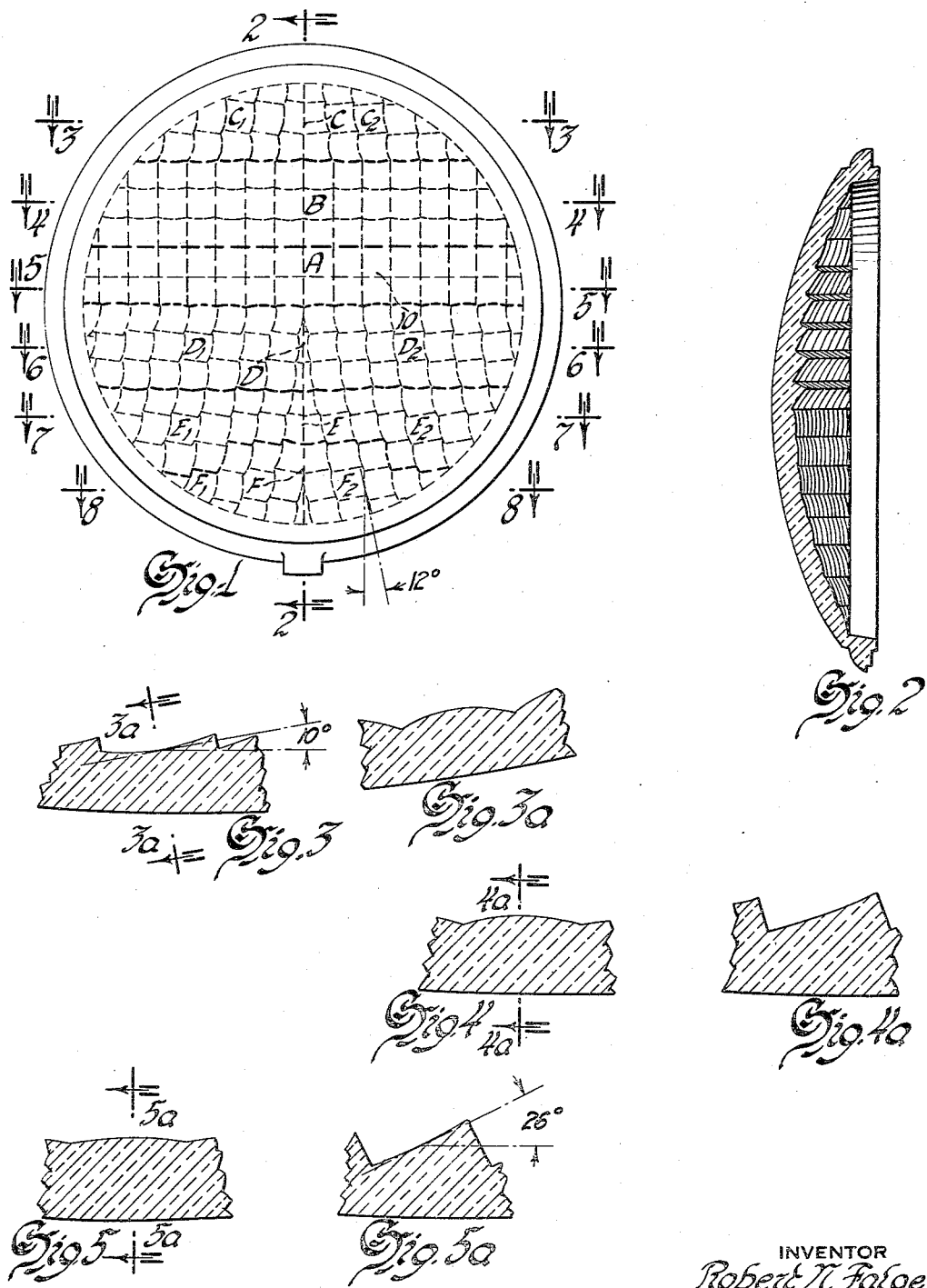
INVENTOR
Robert N. Falge
BY
J. E. Ross
ATTORNEY Aug. 5, 1958  R. N. FALGE  2,846,568
HEADLIGHT LENS
Filed April 9, 1954  2 Sheets-Sheet 2

INVENTOR
Robert N. Falge
BY  S. E. Ross
ATTORNEY

United States Patent Office 2,846,568
Patented Aug. 5, 1958

2,846,568
HEADLIGHT LENS

Robert N. Falge, Anderson, Ind., assignor to General Motors Corporation, Detroit, Mich., a corporation of Delaware Application April 9, 1954, Serial No. 422,213

1 Claim. (Cl. 240—41.4)

This invention relates to vehicle lamps and more particularly, to an improved lens for a vehicle lamp which is adapted to project a trapezoidal beam pattern.

There has recently been recognition by the vehicle lighting industry of the great advantages to be gained, in some instances, by the use of vehicle head lamps adapted to project a beam of light which defines a trapezoid on a vertical screen and which projects a rectangular beam pattern on the ground. This is distinguished from older-type lamps having a beam pattern which on a vertical screen is generally rectangular and on the ground is fan shaped. By means of the so-called trapezoidal beam, a ground pattern which is rectangular even out to its furthest extent in front of the vehicle and which provides better lateral or side lighting is obtained. Such a pattern greatly improves the distribution of light from the head lamps and has been found to be particularly useful on tractors and similar farm vehicles.

It has been proposed to produce a trapezoidal light pattern by constructing a lens with a plurality of contiguous surfaces of compound curvature each of which is shaped to produce a trapezoidal pattern. Thus, the light pattern produced by the entire lens consists of the trapezoidal patterns of each of the contiguous surfaces all superimposed over each other. Because the light distribution within the trapezoidal pattern is determined by the particular shape of the individual surface of compound curvature, it is somewhat difficult to place the light within the trapezoid exactly where it is most needed. In other words, the disadvantage of such a lens structure is that it allows for little flexibility in designing a specific trapezoidal lens for a specific job wherein particular light distribution characteristics within the trapezoid are desired. For example, it is often advantageous to provide a hot spot in the uppermost portion of the beam pattern. It is difficult to accomplish this with the aforementioned type trapezoidal lens because in order to do so would require changing the curvature of at least some, or perhaps all, of the contiguous surfaces on the lens.

It is an object of the present invention to provide an improved method for illuminating a generally rectangularly shaped horizontal area.

Another object of the invention is to produce a lens suitable for use in automotive vehicle head lamps which projects a tarpezoidal beam pattern having improved lighting characteristics.

Another object of the invention is the provision of a lens for producing a trapezoidal beam pattern which allows for flexibility of design to obtain the particular light distribution characteristics desired.

These and other objects are carried out in accordance with the invention by projecting two beams of light, each of which defines a generally rectangular shape when projected on a vertical screen, the corresponding sides of the rectangular beams being at an angle to each other and the lines of direction of the beams being at an angle to each other so that they combined to overlap and form a generally trapezoidal shaped pattern on a vertical screen. This is accomplished by the provision of a head lamp constructed with a lens having two generally rectangular surfaces of compound curvature, with corresponding sides at an angle with respect to each other and having their optical axes also at an angle to each other. Thus, the two generally rectangular surfaces produce beam patterns which are at an angle to each other and which are partially superimposed thereby combining to define a generally trapezoidal pattern on a vertical screen. The lens may additionally be provided with other pairs of similar surfaces and also with portions to produce a hot spot, the sum total of all these surfaces combining to form a generally trapezoidal shape (on a vertical screen) with the light distribution characteristics desired.

Other objects and advantages of the invention will appear more clearly from the following description of a preferred embodiment and from the drawings in which:

Figure 1 is a front view of the preferred embodiment of the lens;

Figure 2 is a cross-sectional view taken on the line 2—2 of Fig. 1;

Fig. 3 is a view taken on a line 3—3 of Figure 1;

Figure 3a is a view taken on a line 3a—3a of Figure 3;

Figure 4 is a view taken on a line 4—4 of Figure 1;

Figure 4a is a view taken on a line 4a—4a of Figure 4;

Figure 5 is a view taken on a line 5—5 of Figure 1;

Figure 5a is a view taken on a line 5a—5a of Figure 5;

Figure 6:
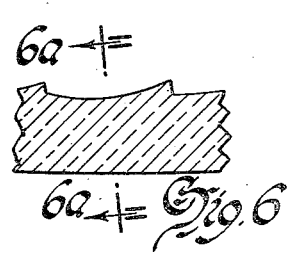
Figure 6 is a view taken on a line 6—6 of Figure 1.
Figures 6A, 7A:
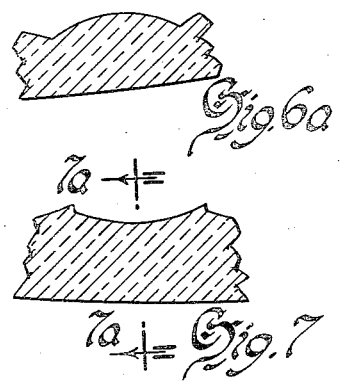
Figure 6a is a view taken on a line 6a—6a of Figure 6.
Figure 7a is a view taken on a line 7a—7a of Figure 7.
Figures 7, 8:
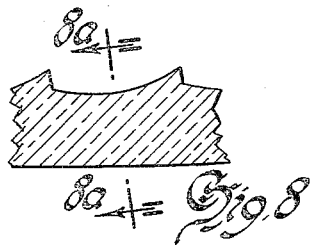
Figure 7 is a view taken on a line 7—7 of Figure 1.
Figure 8 is a view taken on a line 8—8 of Figure 1.
Figure 8A:
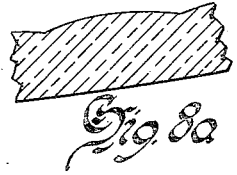
Figure 8a is a view taken on a line 8a—8a of Figure 8.

Referring now to the drawings, and in particular, to Figure 1, there is shown a lens having a plurality of portions A, B, C, D, E, and F, each of these portions having its own particular light spreading, directing and orienting properties, as hereinafter described. Portions C, D, E, and F are subdivided by the vertical center line of the lens into portions $C_1$, $C_2$, $D_1$, $D_2$, $E_1$, $E_2$, $F_1$, $F_2$, respectively. Each portion, as for example, portion A, consists of a multiplicity of contiguous generally rectangular surfaces 10 each having a compound curvature, i. e., a curvature which results from optically superimposing angularly disposed flutes.

The size and shape of the beam pattern projected by any one of these portions is, of course, determined by the vertical and horizontal light-spreading characteristics of the contiguous surfaces within that portion. These light-spreading characteristics are in turn determined by the curvatures of the vertical and horizontal superimposed flutes from which the surfaces are formed.

The direction in which the beam from any one lens portion is projected is determined by the prism angle of the contiguous surfaces within that portion with respect to the plane of the lens. By the term horizontal prism angle, as used herein, is meant the angle between the tangent to the horizontal curvature of the contiguous surface referred to, and the tangent to the lens curvature at the midpoint on the contiguous surface. By the term vertical prism angle is meant the angle between the tangent to the vertical curvature of the contiguous surface referred to, and the tangent to the lens curvature at the midpoint on the contiguous surface. Thus, referring to Fig. 3 the horizontal prism angle of the contiguous surfaces in lens portion C is 10° and, referring to Fig. 5a, the vertical prism angle of the contiguous surfaces in lens portion A is 26°.

The angular orientation of the beam from any one lens portion, with respect to the lens vertical center line, will be determined by the amount of rotation, within the plane of the lens, of the contiguous surfaces in that portion with respect to the vertical center line. In other words, if a contiguous surface within a lens portion has a composite curvature which adapts it to a project a rectangular pattern, this rectangular pattern may be rotated clockwise or counter-clockwise by molding the contiguous surface at an angle in the plane of the lens with respect to the vertical center line. By the term angular rotation, as used herein, is meant the angle between one of the generally vertically extending edges of the contiguous surfaces being referred to, and the vertical center line. This can be seen by reference to Fig. 1, wherein the angular rotation of the contiguous surfaces in lens portion $F_2$ is shown to be 12°.

The light spread, angular orientation and the vertical and horizontal prism angles of the contiguous surfaces in each of the portions of the preferred lens, as shown in Fig. 1, are set forth in the following table.

|   | Horizontal Spread, degrees | Vertical Spread, degrees | Angular Rotation | Vertical Prism Angle | Horizontal Prism Angle |
|---|---|---|---|---|---|
| A | 12 | 2 | 0° | 26° up | 0° |
| B | 20 | 10 | 0° | 18° up | 0° |
| $C_1$ | 20 | 50 | 8° counter-clockwise | 0° | 10° Out-right |
| $C_2$ | 20 | 50 | 8° clockwise | 0° | 10° Out-left |
| $D_1$ | 20 | 30 | 8° counter-clockwise | 0° | 6° Out-right |
| $D_2$ | 20 | 30 | 8° clockwise | 0° | 6° Out-left |
| $E_1$ | 28 | 26 | 12° counter-clockwise | 0° | 3° Out-right |
| $E_2$ | 28 | 26 | 12° clockwise | 0° | 3° Out-left |
| $F_1$ | 28 | 18 | 12° counter-clockwise | 0° | 7° Out-right |
| $F_2$ | 28 | 18 | 12° clockwise | 0° | 7° Out-left |

Figure 9:
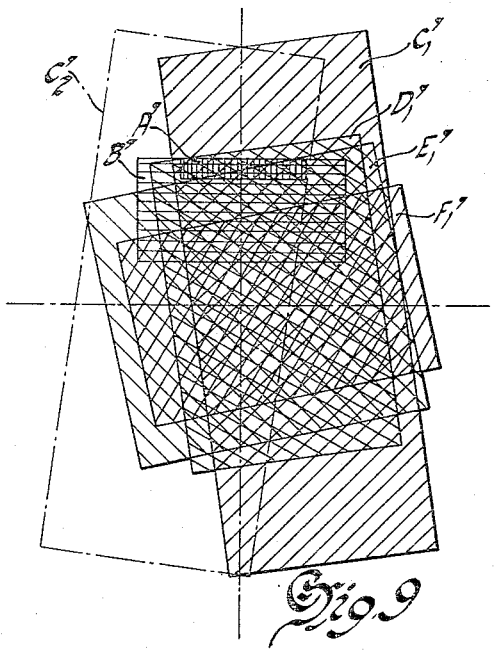
Figure 9 is a view on a vertical screen of a part of the beam pattern projected by the preferred lamp of this invention.

The function of the optics listed on the above table can best be seen by reference to Fig. 9 which shows a part of the beam pattern (on a vertical screen) projected by the lens of Fig. 1 when it is mounted in a lamp having a parabolic reflector with a light bulb at the focal point. Portion $C_1$, of the lens projects the rectangular pattern $C_1'$, having a 20° horizontal spread and a 50° vertical spread. Because of the 8° counterclockwise rotation, the rectangular pattern is at an 8° angle to the vertical centerline as shown. The 10° prism angle, out and to the right (as viewed from behind the lens looking in the direction of the beam) results in the pattern $C_1'$, being displaced out and to the right of the vertical centerline of the screen. Lens portion $C_2$ projects the rectangular pattern $C_2'$. This pattern $C_2'$ has the same light spread as $C_1'$ and is therefore identical in size and shape; however, the 8° rotation is clockwise rather than counterclockwise and the 10° prism angle is out and to the left rather than out and to the right. Thus, pattern $C_2'$ forms a 16° angle with, and overlaps pattern $C_1'$ thereby defining a generally trapezoidal shape.

We prefer to set the rectangular beam patterns at an angle to each other of from 10° to 80°, the combined pattern in all instances defining a generally trapezoidal shape. In the embodiment shown, the optical axes of portion $C_1$ and $C_2$ are at a 20° (10°+10°) angle to each other; however, the optical axes may be set at any angle up to 50° with respect to each other to accomplish the proper amount of overlap. The exact angles used will, of course, depend on the shape of the trapezoid desired.

Beam patterns $C_1'$ and $C_2'$ combine to form the broad outline or periphery of the overall beam pattern of the entire lens. The remaining light patterns from other portions of the lens complement the pattern $C_1'$—$C_2'$ and furnish light where it is most needed within the pattern. Lens portions $D_1$, $E_2$, and $F_1$ produce patterns $D_1'$, $E_1'$, $F_1'$ respectively. To simplify the Fig. 9, the patterns produced by lens portion $D_2$, $E_2$, and $F_2$ have not been shown; however, it will be obvious from the optics listed in the above table that the patterns projected by these lens portions will bear the same relationship to $D_1'$, $E_1'$, and $F_1'$, respectively, as does $C_1'$ to $C_2'$. For example, the pattern from $F_2$ is identical in shape to $F_1'$ but is rotated clockwise so as to be at 24° (2 × 12°) angle to $F_1'$ and is displaced out and to the left from the vertical centerline rather than out and to the right as in the case of $F_1'$.

Lens portions A and B are designed to provide a hot spot within the pattern. Portion B produces the rectangular pattern B' which, because of the vertical prism angle of 18° up, is directed slightly above the horizontal centerline of the screen so as to fall in the upper portion of the overall beam pattern defined by $C_1'$ and $C_2'$. Portion A produces the small but intense rectangular pattern A' which is directed 26° up from the horizontal and which therefore falls within the upper portion of B'. It will be noted that portions A and B are not rotated and thus, the vertical edges of the patterns A' and B' are parallel with the vertical centerline of the screen as shown.

Thus, in the preferred embodiment of the lens, a plurality of portions, i. e., A, B, D, E, and F, are provided so as to produce patterns which will complement that of $C_1$ and $C_2$ and add light at selected points within the trapezoid. However, it is to be understood that only portions the same or similar to $C_1$ and $C_2$ need be used to attain the generally trapezoidal pattern and that other lens portions, if they are used, can take different forms depending upon the particular lighting characteristics desired.

As can be seen from Figs. 3 and 3a to Figs. 8 and 8a inclusive, a combination of convex and concave fluting is used in each portion of the lens in order to attain the contiguous surfaces of compound curvature. This combination of concave and convex fluting is preferable for ease of manufacture; however, it is to be understood that other combinations might be used. For example, the flutes may all be convex or they may all be concave if desired.

Figure 10:
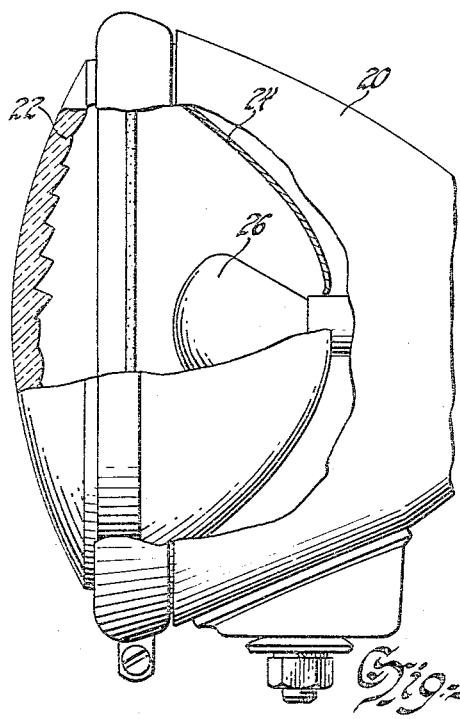
Figure 10 is a side view in partial section of a preferred embodiment of the lamp.

In Fig. 10 there is shown a tractor lamp embodying the invention. This lamp comprises an outer casing 20 which supports lens 22, identical to that shown in Fig. 1, having positioned behind it parabolic reflector 24, carrying at its focal point the lighting element 26. The reflector 24 and lighting element 26 combine to project parallel light rays to lens 22, the lens serving to bend and spread these rays in accordance with the description recited above.

Some or all of the optics herein shown and described as incorporated in the lens element may, if desired, be incorporated into the reflector by means well known in the art. For example, a split type reflector with two or more portions tilted through an angle with respect to each other may, if desired, be used in place of prism angles on the lens.

This lamp is mounted on a vehicle so that it directs the light slightly downwardly and thus, the beam pattern on the ground will be of a generally rectangular shape.

While the lamp shown consists of separate reflector and lens elements, the invention may of course, be embodied in an all-glass type "sealed beam" unit wherein the reflector and lens form an hermetically sealed bulb for a lighting filament mounted at focus.

From the above description of a preferred embodiment, it will be clear that the present invention encompasses lighting devices designed to project at least two light patterns the longitudinal axes of which are at an angle to each other and which overlap so as to define, on a vertical screen, a generally trapezoidal shape. Various changes and modifications of the invention described herein may be made by those skilled in the art without departing from the spirit and principles of the invention.

What is claimed is:

A lens for vehicle headlamps and the like comprising a transparent body divided horizontally into a plurality of portions, each of said portions extending across said lens and having a plurality of contiguous rectangular surfaces of the same compound curvature, some of said lens portions being vertically divided into two sections, the edges of the rectangular surfaces in one of said sections being at an acute angle to the corresponding edges of the rectangular surfaces in the other of said sections and the optical axes of the surfaces in one of said sections being at an angle with respect to the optical axes of the surfaces in the other of said sections so that said sections are adapted to project, on a screen disposed at a right angle to the optical axis of said lens, rectangular light patterns which are at an acute angle to each other and which overlap to define a generally trapezoidal shape, and each of the remainder of said lens portions having rectangular surfaces of compound curvature with corresponding edges all parallel to each other and being adapted to project a horizontally disposed rectangular light pattern superimposed on a portion of the trapezoidal light pattern.

References Cited in the file of this patent

UNITED STATES PATENTS

| | | |
|---|---|---|
| 1,235,675 | Ford | Aug. 7, 1917 |
| 2,122,465 | Graves | July 5, 1938 |
| 2,137,079 | Falge | Nov. 15, 1938 |
| 2,568,494 | Geissbuhler | Sept. 18, 1951 |